(12) United States Patent
Kobayashi et al.

(10) Patent No.: US 7,288,346 B2
(45) Date of Patent: Oct. 30, 2007

(54) COLOR FILTER AND PRODUCTION METHOD THEREOF

(75) Inventors: Hironori Kobayashi, Tokyo (JP); Kaori Yamashita, Tokyo (JP); Masashi Nishiyama, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 223 days.

(21) Appl. No.: 11/232,547

(22) Filed: Sep. 22, 2005

(65) Prior Publication Data

US 2006/0068990 A1    Mar. 30, 2006

(30) Foreign Application Priority Data

Sep. 28, 2004   (JP)  ............................. 2004-282708

(51) Int. Cl.
*G02B 5/20*    (2006.01)
(52) U.S. Cl. .................... 430/7; 349/192; 427/165; 427/535
(58) Field of Classification Search ...................... None
See application file for complete search history.

(56) References Cited

U.S. PATENT DOCUMENTS 4,425,416 A *  1/1984  Ogawa ........................ 430/7
6,677,243 B2 *  1/2004  Okada et al. ............... 438/706
6,828,069 B1 * 12/2004  Nakazawa et al. ............. 430/7

* cited by examiner

*Primary Examiner*—John A. McPherson
(74) *Attorney, Agent, or Firm*—Seyfarth Shaw LLP

(57) ABSTRACT

The main object of the present invention is to provide a production method of a color filter for producing a color filter with the defects generated in the colored layer repaired highly precisely, and a high quality color filter with the defects generated in the colored layer at the time of the production repaired, without color mixture, or the like.

To achieve the object, the present invention provides a production method of a color filter, comprising a colored layer forming step for forming a colored layer by coating a colored layer forming coating solution onto a colored layer forming region on a base material made of an inorganic substance, a plasma irradiating step of irradiating a plasma to the peripheral part of an opening part of the colored layer, using a fluorine compound as an introducing gas, and a defect repairing step of repairing a defect by forming a repaired colored layer by coating the colored layer forming coating solution onto the opening part.

3 Claims, 1 Drawing Sheet

COLOR FILTER AND PRODUCTION METHOD THEREOF

BACKGROUND OF THE INVENTION

1. Field of the Invention

The present invention relates to a high quality color filter with the defects repaired, to be used for a liquid crystal display apparatus, and a production method thereof.

2. Description of the Related Art

Recently, with the development of the personal computers, in particular, the development of the portable personal computers, demand for a liquid crystal display, especially a color liquid crystal display tends to be increased. The color liquid crystal display apparatus in general is provided with a color filter comprising colored layers of three primary colors of red (R), green (G) and blue (B) and a black matrix for partitioning the same so that liquid crystals are operated as a shutter by switching on or off the electrodes each corresponding to the pixels of R, G and B of the color filter. Thereby, color display can be provided according to light transmission to the pixels each of R, G and B.

Here, at the time of forming the colored layers of such a color filter, a defect may be generated by the protrusion generation in the colored layers due to the impurity adhesion, or the like, or a defect may be generated by the foreign substance introduction into the colored layer due to the void generation resulting from incapability of spreading a colored layer forming coating solution for forming the colored layer, or the like. In the case the colored layer has such a defect, when the color filter is used for a liquid crystal display, problems are involved in that the alignment of the liquid crystals formed on the color filter is disturbed, the high quality display cannot be provided, or the like.

Then, conventionally, as a method for repairing such defects, for example, a method of removing the defect portion by the laser beam irradiation, polishing with a tape, or the like, and coating the colored layer forming coating solution for forming the colored layer again, or the like has been used. However, in the case the colored layer is repaired by such a method, it is difficult to coat the colored layer forming coating solution only in the targeted region so that there has been the risk of color mixture, or the like.

SUMMARY OF THE INVENTION

Thus, a production method of a color filter for producing a color filter with the defects generated in the colored layer repaired highly precisely, and a high quality color filter with the defects generated in the colored layer at the time of the production repaired, without color mixture, or the like, have been called for.

The present invention provides a production method of a color filter, comprising a colored layer forming step for forming a colored layer by coating a colored layer forming coating solution onto a colored layer forming region on a base material made of an inorganic substance, a plasma irradiating step of irradiating a plasma to the peripheral part of an opening part of the colored layer, using a fluorine compound as an introducing gas, and a defect repairing step of repairing a defect by forming a repaired colored layer by coating the colored layer forming coating solution onto the opening part.

In the case plasma irradiation is carried out, using a fluorine compound as the introducing gas, the fluorine can be introduced into an organic substance so that the surface can be liquid repellent. In the present invention, according to the plasma irradiation in the plasma irradiation step, only the peripheral part of the opening part can be provided liquid repellent without changing the wettability of the opening part with the base material made of an inorganic substance exposed. Thereby, at the time of coating the colored layer forming coating solution in the defect repairing step, the colored layer forming coating solution can be coated highly precisely onto to the opening part only without adhesion of the colored layer forming coating solution to the peripheral part of the opening part. Therefore, according to the present invention, a high quality color filter can be produced without color mixture, or the like.

According to the invention, the opening part may be produced by removing the colored layer in the defect portion of the colored layer. In the case the defect is generated by color mixture or foreign substance adhesion, or the like in the colored layer forming step, it is preferable to carry out the repairing step after removing the colored layer in the portion.

Moreover, the present invention provides a color filter comprising a base material made of an inorganic substance, and a colored layer formed in a colored layer forming region on the base material, with the colored layer provided with an unrepaired colored layer and a repaired colored layer formed in the opening part of the unrepaired colored layer, wherein the peripheral part of the opening part of the unrepaired colored layer contains a fluorine.

According to the present invention, since the peripheral part of the opening part of the unrepaired colored layer contains a fluorine, the repaired colored layer can be formed highly precisely only in the opening part, utilizing the liquid repellency of the opening part of the unrepaired colored layer so that a high quality color filter without color mixture, or the like can be provided.

According to the present invention, since the fluorine can be introduced only to the peripheral part of the opening part so as to be liquid repellent without changing the wettability of the opening part of the colored layer, the colored layer forming coating solution can be coated only to the opening part so that a high quality color filter without color mixture of the colored layer, or the like can be produced.

DESCRIPTION OF THE PREFERRED EMBODIMENT

The present invention relates to a production method of a color filter for producing a color filter with the defects generated in the colored layer repaired highly precisely, and a high quality color filter with the defects generated in the colored layer at the time of the production repaired, without color mixture, or the like. Hereinafter, each will be explained separately.

A. Production Method of a Color Filter

First, a production method of a color filter of the present invention will be explained. A color filter of the present invention comprising a production method of a color filter, comprising a colored layer forming step for forming a colored layer by coating a colored layer forming coating solution onto a colored layer forming region on a base material made of an inorganic substance, a plasma irradiating step of irradiating a plasma to the peripheral part of an opening part of the colored layer, using a fluorine compound as an introducing gas, and a defect repairing step of repairing a defect by forming a repaired colored layer by coating the colored layer forming coating solution onto the opening part.

Figure 1A:
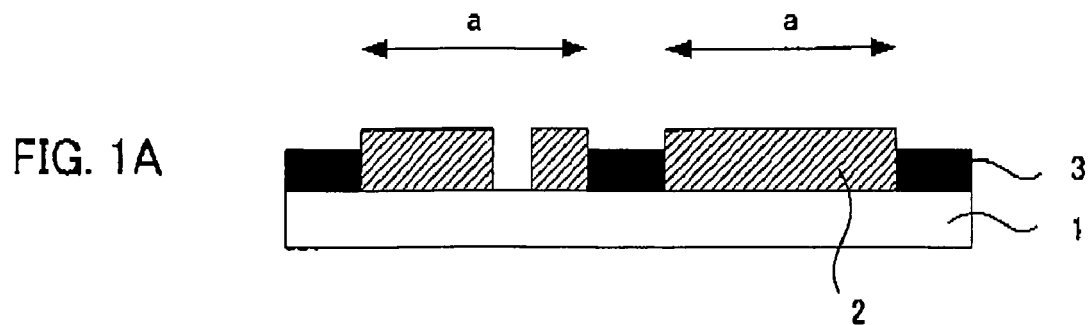
FIGS. 1A to 1C are a process diagram showing an example of a production method of a color filter of the present invention.
Figure 1B:
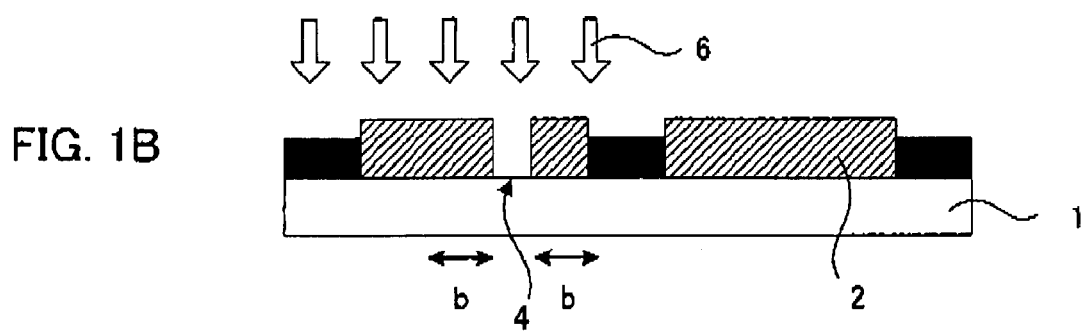
Figure 1C:
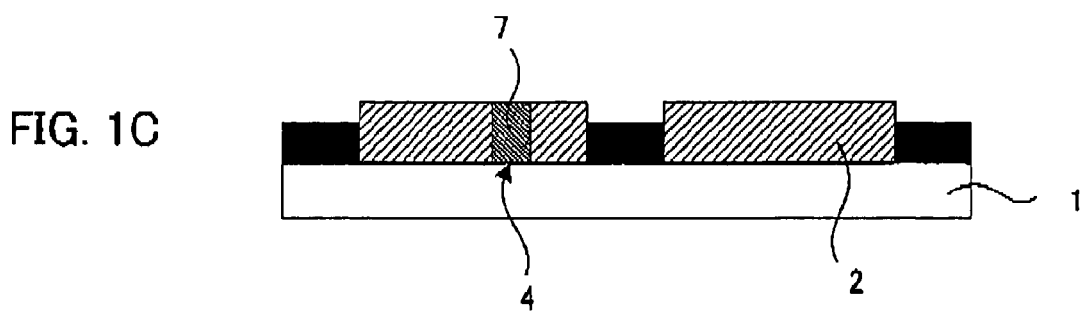

A production method of a color filter of the present invention comprises for example as shown in FIGS. 1A to 1C, a colored layer forming step (FIG. 1A) for forming a colored layer 2 by coating a colored layer forming coating solution onto a colored layer forming region (the region shown by a in the figure) of a base material 1, a plasma irradiating step (FIG. 1B) of irradiating a plasma 6 to the peripheral part (for example, the region shown by b in the figure) of an opening part 4 generated by a void, or the like in the colored layer 2, and a defect repairing step (FIG. 1C) of repairing a defect by forming a repaired colored layer 7 by coating the colored layer forming coating solution onto the opening part 4.

In the case a plasma is directed, using a fluorine compound as the introducing gas, since the fluorine can be introduced to an organic substance so as to have the surface liquid repellent, by the plasma irradiation in the plasma irradiating step, the peripheral part of the opening part can be provided liquid repellent. Moreover, since the base material made of an inorganic substance is exposed in the opening part, even in the case of the plasma irradiation, the surface wettability can remain unchanged without introducing the fluorine as the organic substance. Thereby, in the defect repairing step, the colored layer forming coating solution is not adhered to the peripheral part of the opening part so that the colored layer forming coating solution can be coated highly precisely only to the opening part.

Therefore, according to the present invention, there paired colored layer can be formed only in the targeted region so that a high quality color filter can be produced without color mixture of the colored layer, or the like.

Here, in the present invention, in the case the defect generated in the colored layer forming step is foreign substance introduction, color mixture, or the like, the opening part may be formed by removing the defect part. Moreover, according to the color filter produced by the present invention, for example as shown in FIGS. 1A to 1C, a light shielding part 3 may be formed on the base material 1.

Hereinafter, the production method of the color filter of the present invention will be explained by each step.

1. Colored Layer Forming Step

First, the colored layer forming step of the present invention will be explained. The colored layer forming step of the present invention is a step of forming a colored layer by coating a colored layer forming coating solution onto a colored layer forming region on a base material made of an inorganic substance. Here, the colored layer forming region is a region to have a colored layer formed in a color filter to be produced by the present invention, and it may have a known shape, such as a striped type, a mosaic type, a triangular type, and a four pixel arrangement type. Moreover, the area of the colored layer forming region may be set optionally. In general, the colored layer formed by this step comprises three colors of red (R), green (G) and blue (B).

Moreover, the method of forming the colored layer by coating the colored layer forming coating solution in the colored layer forming region is not particularly limited, and a method used for forming a colored layer of a common color filter can be used. As such a method, for example, the pigment dispersing method, a method of forming by the ink jet method utilizing a hydrophobic/hydrophilic pattern formed on the base material, or the like can be presented.

The colored layer forming coating solution used in this step can be selected optionally according to the colored layer forming method, and since it may be same as that used at the time of forming a colored layer of a common color filter, detailed explanation is omitted here.

Moreover, the base material used in this step is not particularly limited as long as it is made of an inorganic material capable of forming the colored layer, and those conventionally used for a color filter, or the like can be used. Specifically, a transparent rigid material without flexibility, such as a quartz glass, a pyrex (registered trademark) glass, a synthetic quartz plate, and the like can be presented. Among these, since the 7059 glass manufactured by Corning Inc. is a material having a small thermal expansion coefficient having the excellent dimensional stability and the operativity in a high temperature heating process, and furthermore, it is a no-alkaline glass not containing an alkaline component in the glass, it is suitable for a color filter for color liquid crystal display based on an active matrix system. In the present invention, a transparent base material is used in general, but a reflective substrate and a substrate colored in white can be used as well. Moreover, the base material as needed with the surface process for preventing the alkaline elution and providing the gas barrier property, or the like applied can be used. Moreover, one having the above-mentioned process of directing a plasma, or the like onto the colored layer forming region with an oxygen gas used as an introducing gas for having the colored layer forming region to be lipophilic may be used as well.

As mentioned above, a light shielding part may be formed in a region other than the colored layer forming region on the base material. As to such a light shielding part, the same light shielding part used for a common color filter can be used, detailed explanation is omitted here.

2. Plasma Irradiating Step

Next, the plasma irradiating step of the present invention will be explained. The plasma irradiating step in the present invention is a step of directing a plasma to the peripheral part of the opening part of the colored layer, utilizing a fluorine compound as the introducing gas. Moreover, the plasma irradiation method in this seep is not particularly limited as long as the plasma is directed using a fluorine compound as the introducing gas so as to provide the peripheral part of the opening part as a liquid repellent region. The plasma irradiation can be carried out either under a reduced pressure or an atmospheric pressure.

Moreover, the opening part in the present invention denotes a region in the colored layer forming region with the base material exposed without formation of the colored layer. The opening part may be one generated by a void, or the like at the time of forming the colored layer in the colored layer forming step. Moreover, it may be one formed by removal of the colored layer in the defect portion such as color mixture, foreign substance introduction, or the like, generated in the colored layer in the colored layer forming step. As a method of removing the colored layer in the portion with the defect generated, for example, a method of directing a laser such as a YAG laser, a method of polishing, or the like can be presented.

Here, in this step, the plasma is directed to the peripheral part of the opening part. The above-mentioned peripheral part denotes a region surrounding the periphery of the opening part in the colored layer forming region. In the present invention, the peripheral part is preferably a region including a portion with the distance from the end part of the opening part of 10 µm or more, more preferably 20 µm or more.

Moreover, the plasma irradiation is not particularly limited as to the irradiation area, or the like, as long as it is directed to a region including the peripheral part of the opening part. For example, the plasma may be directed locally only to the peripheral part of the opening part, or furthermore, the plasma may be directed on the entire surface of the colored layer.

As the fluorine compound of the introducing gas used for the plasma irradiation, for example, a carbon fluoride ($CF_4$), a fluorine nitride ($NF_3$), a sulfur fluoride ($SF_6$), $C_2Cl_3F_3$, $C_2F_6$, $C_3F_6$, or the like can be presented. Moreover, the irradiation conditions of the plasma to be directed can be selected optionally according to the irradiation device, or the like.

Here, according to the present invention, it is preferable to carry out the plasma irradiation under an atmospheric pressure. Thereby, since a pressure reduction device, or the like, is not needed, it is preferable in terms of the cost, the production efficiency, or the like. The atmospheric plasma irradiation conditions are as follows. For example, the power source output may be same as that used for a common atmospheric plasma irradiation device. Moreover, at the time, the distance between the plasma irradiation electrode and the above-mentioned light shielding part is about 0.2 mm to 20 mm, it is particularly preferably about 1 mm to 5 mm. Furthermore, the flow rate of a fluorine compound used as she above-mentioned introducing gas is about 1 L/min to 100 L/min, and it is particularly preferably about 5 L/min to 50 L/min. The substrate conveyance rate at the time is about 0.1 m/min to 10 m/min, and it is particularly preferably about 0.5 m/min to 5 m/min.

In this step, it is preferable that the plasma irradiation is carried out such that the contact angle of the peripheral part of the opening part with respect to a liquid is higher than the contact angle of the opening part with respect to a liquid by 1° or more. Thereby, the colored layer forming coating solution can be coated only to the opening part, utilizing the liquid repellency of the peripheral part in the defect repairing step to be described later.

In the present invention, in particular, it is preferable to carry out the plasma irradiation so that the contact angle of the peripheral part of the opening part with respect to a liquid of 40 mN/m is 10° or more, preferably, the contact angle with respect to a liquid having a 30 mN/m surface tension is 10° or more, and particularly preferably the contact angle with respect to a 20 mN/m surface tension is 10° or more. In he case the contact angle with respect to the liquid in the peripheral part is small, at the time of coating the colored layer forming coating solution in the defect repairing step to be described later, due to a small liquid repellency, it may be adhered onto the peripheral part.

Moreover, on the above-mentioned opening parts, the contact angle with respect to a liquid of 40 mN/m is less than 9°, preferably, the contact angle with respect to a liquid having a 50 mN/m surface tension is 10° or less, and particularly preferably the contact angle with respect to a 60 mN/m surface tension is 10° or less. It is preferable to use a base material having such a contact angle to the liquid. In the case the contact angle with respect to the liquid in the opening parts is high, the above-mentioned colored layer forming coating solution may be repelled also in the lyophilic region so that the repaired colored layer may hardly be formed due to insufficient spreading of the colored layer forming coating solution in the defect repairing step to be described later.

The contact angle with respect to a liquid here is obtained from the results or graph of the results of measuring (30 seconds after of dropping liquid droplets from a micro syringe) the contact angle with respect to liquids having various surface tensions using a contact angle measuring device (CA-Z type manufactured by Kyowa Interface Science, Co., Ltd). Moreover, at the time of the measurement, as the liquids having the various surface tensions, wetting index standard solution manufactured by JUNSEI CHEMICAL CO., LTD. were used.

3. Defect Repairing Step

Next, the defect repairing step in the present invention will be explained. The defect repairing step in the present invention is a step of repairing a defect by forming a repaired colored layer by coating the colored layer forming coating solution on the opening part. In the present invention, since a fluorine is introduced to the peripheral part of the opening part by the plasma irradiating step so as to provide the liquid repellency, the repaired colored layer can be formed only in the opening part without adhesion of the colored layer forming coating solution on the peripheral part.

Here, the method of coating the colored layer forming coating solution onto the opening part is not particularly limited as long as the colored layer forming coating solution can be coated only to the opening part. In the present invention, coating by the ink-jet method is particularly preferable. Thereby, the colored layer forming coating solution can be coated on the opening part highly precisely.

The colored layer forming coating solution used in this step may either be same as or different from the colored layer forming coating solution used in the colored layer forming step. As the colored layer forming coating solution, those used for the colored layer of a common color filter can be used, and thus detailed explanation is omitted.

B. Color Filter

Next, a color filter of the present invention will be explained. The color filter of the present invention provides comprising a base material made of an inorganic substance, and a colored layer formed in a colored layer forming region on the base material, with the colored layer provided with an unrepaired colored layer and a repaired colored layer formed in the opening part of the unrepaired colored layer, wherein the peripheral part of the opening part of the unrepaired colored layer contains a fluorine.

Figure 2:
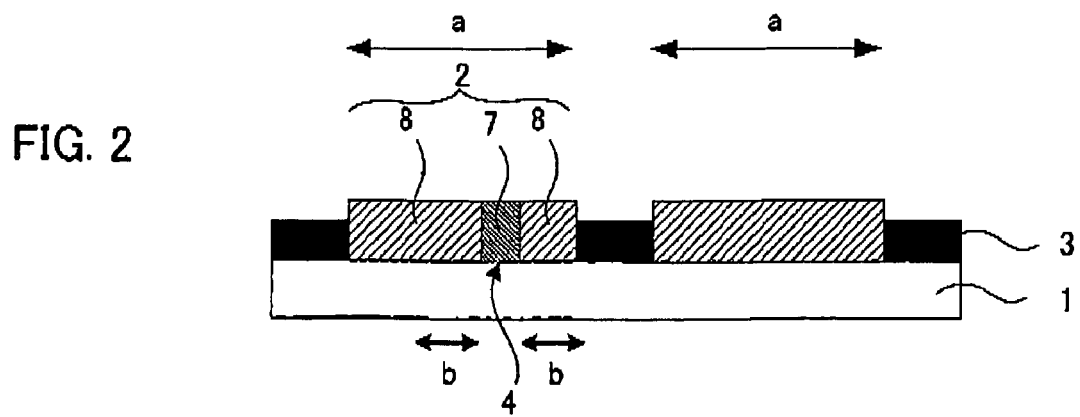
FIG. 2 is a schematic cross-sectional view showing an example of a color filter of the present invention.

The color filter of the present invention comprises for example as shown in FIG. 2, a base material 1, and a colored layer 2 formed in a colored layer forming region (the portion shown by a in the figure) of the base material 1, with the colored layer 2 provided with an unrepaired colored layer 8 and a repaired colored layer 7 formed in the opening part 4 of the unrepaired colored layer 8, wherein the peripheral part (for example, the region shown by b in the figure) of the opening part 4 of the unrepaired colored layer 8 contains a fluorine. According to the color filter of the present invention, a light shielding part may not be formed, however, a light shielding part 3 may be formed in a region other than the colored layer forming region for example as shown in FIG. 2.

According to the present invention, the peripheral part of the opening part of the unrepaired colored layer contains a fluorine so that the surface is liquid repellent. Thereby, the repaired colored layer can be formed while utilizing the liquid repellency of the peripheral part of the opening part of the unrepaired colored layer so that the repaired colored layer can be formed highly precisely. Therefore, according to the present invention, a high quality color filter without a defect such as color mixture can be formed. Hereinafter, each configuration of the color filter of the present invention will be explained.

1. Colored Layer

First, the colored layer used in the present invention will be explained. The colored layer used for the color filter of the present invention formed in a colored layer forming region on the base material, comprises an unrepaired colored layer and a repaired colored layer formed in the opening part of the unrepaired colored layer, wherein the peripheral part of the opening part of the unrepaired colored layer contains a fluorine.

Here, the unrepaired colored layer denotes a colored layer not repaired at the time of producing the color filter, and the repaired colored layer denotes a colored layer formed newly for repair at the time of producing the color filter. Moreover, the opening part of the unrepaired colored layer denotes a portion with the unrepaired colored layer removed in the colored layer forming region or a portion without formation of the unrepaired colored layer due to a void, or the like at the time of forming the unrepaired colored layer. Furthermore, the peripheral part of the opening part of he abovementioned unrepaired colored layer denotes a region surrounding the periphery of the opening part in the colored layer forming region. In the present invention, the peripheral part is preferably a region including a portion with the distance from the end par: of the opening part of 10 μm or more, more preferably 20 μm or more.

According to the present invention, since the peripheral part of the opening part of the unrepaired colored layer contains a fluorine, the repaired colored layer can be formed highly precisely without color mixture, or the like. Here, it is preferable that the fluorine is contained in the peripheral part such that the contact angle of the peripheral part with respect to a liquid is higher than the contact angle of the base material to be described later with respect to a liquid by 1° or more. Thereby, the repaired colored layer can be formed, utilizing the wettability difference between the opening part and the peripheral part.

Moreover, according to the present invention, in particular, the fluorine is contained in the peripheral part of the opening part such that the contact angle with respect to a liquid of 40 mN/m is 10° or more, preferably, the contact angle with respect to a liquid having a 30 mN/m surface tension is 10° or more, and particularly preferably the contact angle with respect to a 20 mN/m surface tension is 10° or more. Thereby, at the time of forming the repaired colored layer, the colored layer forming coating solution is not adhered to the peripheral part so that a high quality color filter without color mixture, or the like can be provided. The contact angle with respect to a liquid here is a value measured by the method mentioned above.

Here, the presence of the fluorine in the peripheral part of the opening part in the present invention can be confirmed by measuring the ratio of the fluorine element in the all elements detected from the peripheral part of the opening part by the analysis with an X ray photoelectron spectrometer (XPS: ESCALAB 220i-XL). Moreover, the above-mentioned ratio of the fluorine at the time is preferably 10% or more.

Since the method for forming the unrepaired colored layer and repaired colored layer, the method of introducing the fluorine, or the like, are same as those explained in the item of "A. Production method of a color filter", detailed explanation is omitted here.

2. Base Material

Next, the base material used in the present invention will be explained. The base material used in the present invention is not particularly limited as long as it is made of an inorganic substance and capable of forming the colored layer so that the base materials used for a common color filter can be used and those explained in the item "A. Production method of a color filter" can be used.

Here, according to the present invention, in particular, as the base material, one having the contact angle with respect to a liquid of 40 mN/m of less than 9°, preferably, the contact angle with respect to a liquid having a 50 mN/m surface tension of 10° or less, and particularly preferably the contact angle with respect to a 60 mN/m surface tension of 10° or less is used preferably. At the time of producing the color filter of the present invention, since the base material is exposed at the opening part of the unrepaired colored layer, by providing the contact angle of the base material with respect to a liquid in the range, the repaired colored layer can be formed easily, utilizing the difference of the contact angle of the peripheral part of the opening part of the unrepaired colored layer with respect to a liquid and the contact angle of the base material with respect to a liquid. The contact angle with respect to a liquid here is a value measured by the method mentioned above.

3. Color Filter

The color filter of the present invention is not particularly limited as long as it comprises the base material and a colored layer formed on the base material, and as needed, a protection layer, a transparent electrode layer, or the like may be formed.

The present invention is not limited to the embodiments. The embodiments are merely examples, and any one having the substantially same configuration as the technological idea disclosed in the claims of the present invention and the same effects is included in the technological scope of the present invention.

EXAMPLES

Hereinafter, the present invention will be explained in further detail with reference to the examples.

Example 1

1. Formation of the Light Shielding Part

A mixture of the below-mentioned composition was dissolved by heating at 90° C. and carrying out the centrifugal separation at 12,000 rpm, and then it was filtrated with a 1 μm glass filter. By adding 1% by weight of an ammonium dichromate as a cross linking agent to the obtained water based coloring resin solution, a paint for the light shielding part was prepared.

| | |
|---|---|
| Carbon black (produced by Mitsubishi Chemical Corporation #950) | 4 parts by weight |
| Polyvinyl alcohol (produced by Nippon Synthetic Chemical Industry Co., Ltd., GOHSENOL AH-26) | 0.7 part by weight |
| Ion exchange water | 95.3 parts by weight |

A light shielding film (resist) pattern was formed using the obtained paint for a light shielding part for the evaluation.

First, the above-mentioned paint for the light shielding part was coated onto a sodium glass transparent base material with a spin coater and dried by a hot plate at 80° C. for 1 minute. The film thickness after the drying operation measured by a stylus film thickness meter (α-step, produced by KLA-Tencor Corporation) was 1 μm. Next, the sample was image-exposed with a mercury lamp through a mask. Subsequently, it was soaked in a developing agent containing 0.05% of a potassium hydroxide and 0.1% of a nonionic surfactant (EMULGEN A-60 produced by KAO CORPORATION) at 25° C. for development so as to obtain a light shielding pattern. Thereafter, by carrying out carrying operation at 60° C. for 3 minutes and exposing with a mercury lamp, the paint for the light shielding part was hardened. Furthermore, by applying a heat treatment at 150° C. for 30 minutes, a light shielding part was formed.

2. Formation of the Colored Layer

Next, using an ink jet device, UV hardening type polyfunctional acrylate monomer inks (colored layer forming coating solution) each of RGB color containing 5 parts by weight of a pigment, 20 parts by weight of a solvent, 5 parts by weight of a polymerization initiating agent and 70 parts by weight of a UV hardening resin were adhered to the opening part for coloring, By carrying out the UV process thereto, they were hardened to form a color filter. Here, for each of the red, green and blue inks, a polyethylene glycol monomethyl ethyl acetate was used as the solvent, IRGACURE 369 (product name, produced by Chiba Specialty Chemicals) as the polymerization initiating agent, and a DPHA (dipentaerythritol hexaacrylate (produced by NIPPON KAYAKU Co., LTD.)) as the UV hardening resin. Moreover, as to the pigment, for the red ink, C. I. Pigment Red 177, for the green ink, C. I. Pigment Green 36, and for the blue ink, C. I. Pigment Blue 15+ C. I. Pigment violet 23 were used, respectively.

According to the optical microscope observation of the obtained color filter, there were portions with an opening part by a void generated without neatly spreading the colored layer forming coating solution at the end part of the colored layer so as to expose the base material made of an inorganic substance.

3. Atmospheric Pressure Plasma Irradiation

An atmospheric pressure plasma was irradiated by the below-mentioned conditions to a region including the opening part with the inorganic substance exposed and 100 μm of the colored layer in the periphery thereof.

(Atmospheric Pressure Plasma Irradiation Conditions)
Introducing gas: $CF_4$ . . . 15 (1/min)
Interval between the electrode and the substrate: 2 mm
Power source output: 200V-5A According to the result of the surface analysis of the atmospheric pressure plasma process region of the color filter by the below-mentioned conditions with an X ray photoelectric spectrometer (XPS: ESCALAB220i-XL), a large amount of the organic fluorine based components ($CF_3$—$CF_2$—$CF_2$—, $CF_2$—$CF_2$—, $CF_2$—$CH_2$—) were detected by 36% in the peripheral colored layer region with the atmospheric pressure plasma processed, and the organic fluorine based components were not detected in the void portions with the inorganic substance exposed. (Measurement Conditions)
X ray source: Monochromated Al Kα (monochromatic X ray)
X ray output: 10 kV·18 mA
Used lens: Small Area XL150
Charge neutralization: electron neutralizing gun+4 (V)·0.05 (mA)
Photoelectron escape angle: 90 degrees 4. Confirmation of the Liquid Repellent Region Formation in the Atmospheric Pressure Plasma Irradiation Portion The same colored layer as mentioned above was formed on the same glass substrate as the base material such that the glass substrate is partially exposed. Thereafter, the atmospheric pressure plasma was directed onto the colored layer and the glass substrate by the same conditions as in the atmospheric pressure plasma irradiation mentioned above. Only the colored layer with the atmospheric pressure plasma irradiated was liquid repellent (result of the measurement of the contact angle with respect to a liquid having a 30 mN/m surface tension (wetting index standard solution manufactured by JUNSEI CHEMICAL CO., LTD.) with a contact angle measuring device (CA-Z type manufactured by Kyowa Interface Science, Co., Ltd.): 28 degrees), and the glass substrate was lyophilic (result of the measurement of the contact angle with respect to a liquid having a 50 mN/m surface tension (wetting index standard solution manufactured by JUNSEI CHEMICAL CO., LTD.) in the same manner: 5 degrees). Accordingly, since the colored layer becomes a liquid repellent region, the region with the base material exposed can be used as a lyophilic region, and it was confirmed that the repaired colored layer can be formed, utilizing the wettability difference between the opening part and the peripheral part thereof.

5. Formation of the Repaired Colored Layer

Subsequently, to the color filter with the atmospheric pressure plasma irradiated, a UV hardening type polyfunctional acrylate monomer ink for each RGB color (colored layer forming coating solution) including 5 parts by weight of a pigment, 20 parts by weight of a solvent, 5 parts by weight of a polymerization initiating agent, and 70 parts by weight of a UV hardening resin was adhered only to the opening part, utilizing the liquid repellency in the peripheral part and the lyophilic property in the opening part with an ink jet device for coloring, and the UV process was applied thereto for curing so as to form a repaired colored layer.

What is claimed is:

1. A production method of a color filter, comprising:
   a colored layer forming step for forming a colored layer by coating a colored layer forming coating solution onto a colored layer forming region on a base material made of an inorganic substance;
   a plasma irradiating step of irradiating a plasma to a peripheral part of an opening part of the colored layer, using a fluorine compound as an introducing gas; and
   a defect repairing step of repairing a defect by forming a repaired colored layer by coating the colored layer forming coating solution onto the opening part.

2. The production method of a color filter according to claim 1, wherein the opening part is produced by removing the colored layer in a defect portion of the colored layer.

3. A color filter comprising a base material made of an inorganic substance, and a colored layer formed in a colored layer forming region on the base material, with the colored layer provided with an unrepaired colored layer and a repaired colored layer formed in an opening part of the unrepaired colored layer, wherein a peripheral part of the opening part of the unrepaired colored layer contains a fluorine.

* * * * *